United States Patent [19]
Morimoto

[11] Patent Number: 6,024,785
[45] Date of Patent: Feb. 15, 2000

[54] INK-JET RECORDING INK AND AN INK-JET RECORDING METHOD

[75] Inventor: Hitoshi Morimoto, Hino, Japan

[73] Assignee: Konica Corporation, Tokyo, Japan

[21] Appl. No.: 09/061,459

[22] Filed: Apr. 16, 1998

[30] Foreign Application Priority Data

Apr. 23, 1997 [JP] Japan ..................................... 9-105838

[51] Int. Cl.⁷ .................................................. C09D 11/02
[52] U.S. Cl. .................................... 106/31.57; 106/31.52; 106/31.58
[58] Field of Search ............................. 106/31.58, 31.52, 106/31.57

[56] References Cited

U.S. PATENT DOCUMENTS

| | | | |
|---|---|---|---|
| 4,923,515 | 5/1990 | Koike et al. | 106/31.58 |
| 4,965,609 | 10/1990 | Tomida et al. | 106/31.58 |
| 5,099,255 | 3/1992 | Koike et al. | 106/31.58 |
| 5,560,771 | 10/1996 | Takemoto et al. | 106/31.58 |

FOREIGN PATENT DOCUMENTS

| | | |
|---|---|---|
| 0 651 037 A1 | 5/1995 | European Pat. Off. . |
| 0 796 901 A2 | 9/1997 | European Pat. Off. . |
| 660 750 A5 | 6/1987 | Switzerland . |

OTHER PUBLICATIONS

Patent Abstracts of Japan, vol. 011, No. 394 (C–465), Dec. 23, 1987 of JP 62 156179 A, Jul. 11, 1987.
Patent Abstract of Japan, vol. 018, No. 010 (C–1152), Jan. 13, 1994 of JP 05 255625 A, Oct. 5, 1993.
Patent Abstracts of Japan, vol. 006, No. 131 (C–114), Jul. 17, 1982 of JP 57 057761, Apr. 7, 1982.
Patent Abstracts of Japan, vol. 005, No. 111 (C–063), Jul. 18, 1981 of JP 56 049770 A, May 6, 1981.
Derwent Abstract of JP57/057761, Apr. 1982.
Derwent abstract of JP56/049770, May 1981.
Derwent absrtact of JP05/255625, Oct. 1993.
Derwent absrtact of JP62/156179, Jul. 1987.

*Primary Examiner*—Helene Klemanski
*Attorney, Agent, or Firm*—Frishauf, Holtz, Goodman, Langer & Chick, P.C.

[57] ABSTRACT

An ink-jet recording ink is disclosed. It comprises a water-soluble high-boiling point organic solvent (A) having a viscosity of not less than 500 cP at 20° C., a water-soluble high-boiling point organic solvent (B) having a viscosity of not more the 30 cP at 20° C., a water soluble dye and water, and a total of (A) and (B) is 10 to 30 weight percent and a weight ratio of (A) to (B) is ¼ to 4. The ink is excellent in ejection stability and re-ejection stability after long-term suspension of printing.

14 Claims, No Drawings

INK-JET RECORDING INK AND AN INK-JET RECORDING METHOD

FIELD OF THE INVENTION

The present invention relates to an ink-jet recording ink and an ink-jet recording method, and more specifically to an ink-jet recording ink exhibiting improved ejection stability, and an ink-jet recording method using the same.

BACKGROUND OF THE INVENTION

An ink-jet recording method, in which information is recorded onto a recording material (hereafter, occasionally abbreviated as a medium) by controlled ejection of an ink onto the recording material without contact of a recording head with the recording material, exhibits advantages such as low noise, high-speed printing, capability of recording onto plain paper sheets, and the like.

As the ink-jet recording ink which is applied in the ink-jet recording method mentioned above, those which have been known and have been employed are composed of, as main components, various kinds of dyes or pigments, and water or a water-soluble solvent which dissolves or disperses those dyes or pigments, and various kinds of additives, as desired.

Such ink-jet recording inks are required to provide for:
(1) No clogging to be caused in the nozzle of the ink-jet recording head
(2) Appropriate physical properties to be possessed so as to meet ink ejection characteristics (flying stability, frequency response, etc.)
(3) Ink-jet recording ink to be non-corrosive to materials in contact
(4) Stability is secured over long-term storage
(5) Stable re-ejection after long-term suspension of printing is secured Furthermore, the following characteristics are required when the ink-jet recording ink is employed for printing onto a recording material:
(6) Rapid drying ink
(7) Good printing quality
(8) Good image retention qualities (light fastness, water resistance, etc.)

In order to fully meet the above-mentioned requirements, it is necessary for contradicting characteristics to coexist such as, for example, rapid drying after printing described in (6), while preventing drying of the ink in the nozzle during suspension of printing so as to meet the requirement described in (1).

Drying of ink in the nozzle during suspension of printing may be prevented by addition of a large amount of a water-soluble high-boiling point organic solvent. However, by so doing, the water-soluble high-boiling point organic solvent remains on the medium after printing, and the image is likely to be deteriorated during storage. Furthermore, in order to prevent deposition of dye, it has been proposed to decrease the amount of divalent ions or inorganic ions. However, the effect has been insufficient for the high concentration of the dye. In addition, because ink for continuous use requires electric conductivity of more than a specific value, an inorganic ion is frequently added.

Furthermore, Japanese Patent Publication Open to Public Inspection No. 62-181372 discloses a method in which the ink during suspension of printing is gelled to prevent drying ink. However, ink comprising a gelling agent is not absorbed quickly into a medium and therefore tends to degrade the image quality. Japanese Patent Publication Open to Public Inspection No. 5-148437 discloses a method in which an organic acid salt having an amine derivative and a hydroxyl group is added to an ink. However, when an inorganic salt is added together, no sufficient effect is obtained.

Conventionally, a number of ink-jet recording inks have been proposed. However, none have yet all the requirements mentioned above.

SUMMARY OF THE INVENTION

An object of the present invention is to provide an ink-jet recording ink which is excellent in ejection properties, re-ejection after long-term suspension of printing and printing quality, and an ink-jet recording method of using the same, and more specifically to provide an ink-jet recording ink which is excellent in ejection stability, and an ink-jet recording method of using the same.

Another object of the present invention is to provide an ink-jet recording ink which is excellent in re-ejection stability after long-term suspension of printing, and an ink-jet recording method of using the same.

The ink of the present invention and its embodiment are described.

The ink-jet recording ink comprises a water-soluble high-boiling point organic solvent (A) having a viscosity of not less than 500 cP at 20° C., a water-soluble high-boiling point organic solvent (B) having a viscosity of not more than 30 cP at 20° C., a water-soluble dye and water. The total amount of (A) and (B) is 10 to 30 weight percent, and a weight ratio of (A) to (B) of ¼ to 4.

The concentration of the water-soluble dye is preferably 2 to 5 weight percent.

The water-soluble dye is preferably Acid Yellow 23, Direct Yellow 44, Reactive Red 180, Acid Red 249, Acid Blue 9, or a dye represented by the following general formula,

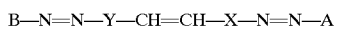

B—N=N—Y—CH=CH—X—N=N—A wherein X and Y each independently represents a phenylene group having a —SO$_3$M group, and A and B each independently represents a phenyl group or a naphthyl group having a —SO$_3$M group or a —COOH group. M represents a hydrogen atom, an alkali metal atom, an ammonium salt or an amine derivative.

The water-soluble high-boiling point organic solvent (B) is preferably ethylene glycol.

The ink-jet recording ink comprises glycerin, a water-soluble high-boiling point organic solvent (C) having a viscosity of not more than 100 cP at 20° C., a water soluble dye and water, and having a total weight of glycerin and the organic solvent (C) of 10 to 30 weight percent, and a weight ratio of glycerin to the organic solvent (C) is ¼ to 4 and a surface tension of the ink is not less than 40 dyne/cm.

The water-soluble high-boiling point organic solvent (C) is preferably selected from ethylene glycol, thiodiglycol, monoacetin, diacetin, 1,3-propanediol and propylene glycol.

In the above, the water-soluble dye is preferably selected from Acid Yellow 23, Direct Yellow 144, Reactive Red 180, Acid Red 249, Acid Blue 9, and a dye represented by the general formula (1).

The ink is suitably applied to a continuous type ink-jet printer.

DETAILED DESCRIPTION OF THE INVENTION

The present invention provides an ink-jet recording ink comprising a water-soluble high-boiling point organic solvent (A) having a viscosity of not less than 500 cP at 20° C., a water-soluble high-boiling point organic solvent (B) having a viscosity of not more than 30 cP, preferably not more than 25 cP at 20° C., a water-soluble dye, and water; having a total of (A) and (B) of 10 to 30 weight percent, and a weight ratio of (A) to (B) of ¼ to 4; comprising preferably the water-soluble dye having a concentration between 2 to 6 weight percent, and more preferably at least one of water-soluble dyes selected from Acid Yellow 23, Direct Yellow 144, Reactive Red 180, Acid Red 249, Acid Blue 9, or at least one of compounds represented by the general formula (1), and more preferably ethylene glycol as the water-soluble high-boiling point organic solvent (B).

Furthermore, the present invention provides an ink-jet recording ink comprising glycerin, a water-soluble high-boiling point organic solvent (C) having a viscosity of not more than 100 cP at 20° C., a water soluble dye and water, and having a total weight of glycerin and said organic solvent (C) of 10 to 30 weight percent, a weight ratio of glycerin to the organic solvent (C) of ¼ to 4 and a surface tension of not less than 40 dyne/cm; preferably comprising at least one of the water-soluble high-boiling point organic solvents (C) selected from ethylene glycol, thiodiglycol, monoacetin, diacetin, 1,3-propanediol or propylene glycol, and more preferably the water-soluble dye selected from Acid Yellow 23, Direct Yellow 144, Reactive Red 180, Acid Red 249, Acid Blue 9, or at least one of compounds represented by the general formula (1).

Further, the present invention provides a recording method in which the above-mentioned ink-jet recording ink and a continuous type ink-jet printer are employed.

Dyes represented by the general formula (1) are described in detail below.

In the general formula (1), A and B each independently represents a phenyl group or a naphthyl group having a —$SO_3M$ or —COOM group, and the phenyl and naphthyl groups may each have other substituents. In this case, the substituents include a hydroxyl group or an alkoxy group (having 1 to 3 carbon atoms such as, for example, a methoxy group, an ethoxy group, a n-propyloxy group, etc.), an alkyl group (having 1 to 3 carbon atoms) such as, for example, a methyl group, an ethyl group, an i-propyl group, etc., an amino group, etc.

M represents a hydrogen atom, an alkali metal atom, an ammonium salt or an amine derivative, specifically a lithium atom, a sodium atom, a potassium atom, an ammonium salt, monoethanolamine, diethanolamine, triethanolamine, propanolamine, etc.

Furthermore, a plurality of dyes represented by the general formula are preferably employed in combination.

Specific examples of dyes represented by the general formula (1) include those described in Japanese Patent Publication Open to Public Inspection Nos. 59-75964, 4-168166 and 5-255625.

Exemplified compounds of dyes represented by the general formula (1) are illustrated below.

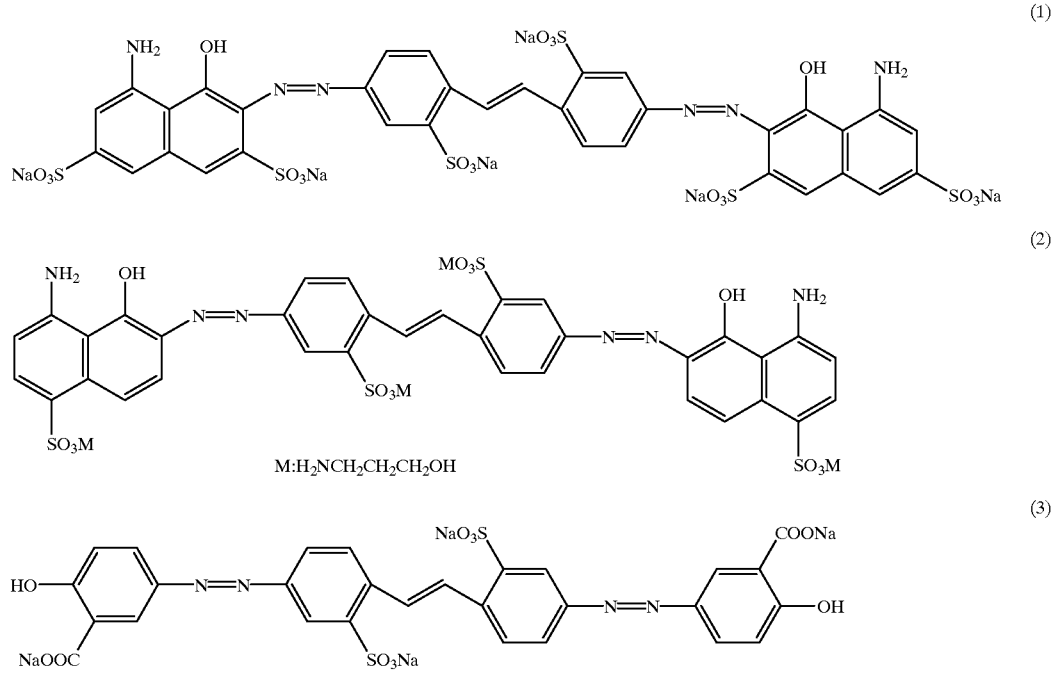

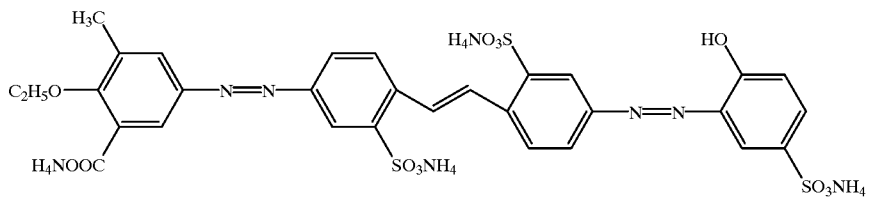

(4)

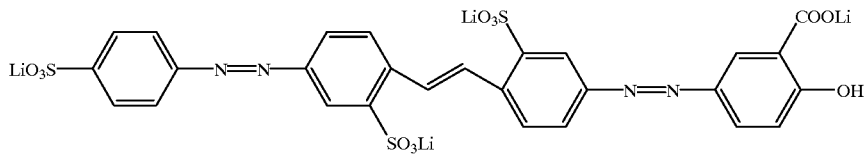

(5)

It has been found that maintaining physical properties of an ink suitable for the ejection, causing no clogging at re-ejection after long-term suspension of printing and obtaining stable ejection may be obtained by employing an ink-jet recording ink comprising a water-soluble high-boiling point organic solvent (A) having a viscosity of not less than 500 cP at 20° C., a water-soluble high-boiling point organic solvent (B) having a viscosity of not more than 30 cP at 20° C., a water-soluble dye and water, and having a total of (A) and (B) of 10 to 30 weight percent, and a weight ratio of (A) to (B) of ¼ to 4. The water-soluble high-boiling point organic solvent herein designates a solvent having a boiling point of not less than 120° C. under one atmospheric pressure and water solubility of not less than 10 weight percent.

Specific examples of the above-mentioned water-soluble high-boiling point solvents (A), (B), and (C) are illustrated below.

Specific examples of the water-soluble high-boiling point organic solvent (A) include glycerin, 1,2,6-hexanetriol. Specific examples of the water-soluble high-boiling point organic solvent (B) include ethylene glycol, ethylene glycol monomethyl ether, propylene glycol monomethyl ether, propylene glycol monoethyl ether, propylene glycol monobutyl ether, diethylene glycol diethyl ether, triethylene glycol monomethyl ether, triethylene glycol monoethyl ether, N-methylpyrrolidone, 2-pyrrolidone, etc. Specific examples of the water-soluble high-boiling point organic solvent (C) include those included in the above-mentioned water-soluble high-boiling point organic solvent (B), and propylene glycol, 2-methyl-2,4-pentanediol, tetraethylene glycol, thioglycol, thiodiglycol, monoacetin, diacetin, 1,3-propanediol, triethylene glycol, 2-phenoxyethanol, 1,2-propanediol, 1,4-butanediol, etc.

Namely, the ink-jet recording ink comprising a small amount of the water-soluble high-boiling point organic solvent causes clogging at the ejection due to the dye deposit during long-term suspension of printing. On the other hand, ink-jet recording ink comprising a large amount of the water-soluble high-boiling point organic solvent requires a higher pressure for ejection due to the increase in viscosity and causes a higher load on the device. Thus, the above-mentioned problems are solved by employing the ink-jet recording ink comprising a water-soluble high-boiling point organic solvent (A) having a viscosity of not less than 500 cP at 20° C., a water-soluble high-boiling point organic solvent (B) having a viscosity of not more than 30 cP at 20° C., a water-soluble dye and water, and having a total of (A) and (B) of 10 to 30 weight percent.

Furthermore, the ink-jet recording ink prepared by employing a water-soluble high-boiling point organic solvent having a viscosity of not less than 500 cP at 20° C. is superior at dissolving a dye, when water is evaporated. However, the water evaporation markedly increases the viscosity to much more than 500 cP. On the other hand, the ink-jet recording ink prepared by employing a water-soluble high-boiling point organic solvent having a viscosity of not more than 30 cP at 20° C. is inferior in dissolving the dye, when water is evaporated. However, the increase in viscosity is not large.

An ink inferior in dissolving a dye during water evaporation causes clogging at a repeated ink ejection due to the deposition of the dye during long-term suspension of printing. Furthermore, ink having a markedly increased viscosity during water evaporation results in an increase in viscosity during long-term suspension of printing. An ink-jet recording ink having increased viscosity is inferior in the rate of dissolution for the ink-jet recording ink exhibiting no water evaporation, and thus, it takes long time to obtain the stable ink ejection.

The above-mentioned problems have been resolved by adjusting the weight ratio of (A) to (B) to the range of ¼ to 4, or preferably ⅓ to 3, wherein (A) represents a water-soluble high-boiling point organic solvent having a viscosity of not less than 500 cP at 20° C. and (B) represents a water-soluble high-boiling point organic solvent having a viscosity of not more than 30 cP at 20° C.

Furthermore, in order to resolve the above-mentioned problems, the ink-jet recording ink preferably comprises a water-soluble dye having a concentration of 2 to 6 weight percent, more preferably comprises a water-soluble dye selected from Acid Yellow 23, Direct Yellow 144, Reactive Red 180, Acid Red 249, Acid Blue 9 or those represented by the general formula (1), and more preferably comprises ethylene glycol as the water-soluble high-boiling point organic solvent (B).

Furthermore, the inventors of the present invention have found that retaining ink properties suitable for ejection, no clogging at re-ejection after long-term suspension of printing and stable ink ejection are obtained by employing an ink-jet recording ink comprising glycerin, a water-soluble high-boiling point organic solvent (C), a water soluble dye and water, and having a total of glycerin and (B) of 10 to 30 weight percent and a weight ratio of glycerin to (B) of ¼ to 4, and the surface tension of the ink is not less than 40 dyne/cm.

Namely, an ink-jet recording ink comprising a small amount of the water-soluble high-boiling point organic solvent causes clogging at re-ejection after long-term suspension of printing due to the deposition of the dye. On the other hand, an ink-jet recording ink comprising a large amount of the water-soluble high-boiling point organic solvent results in an increase in viscosity which requires higher pressure for ink ejection and increases the load for a device. The above-mentioned problems are then resolved by employing an ink-jet recording ink comprising glycerin, a water-soluble high-boiling point organic solvent (C) having a viscosity of not more than 100 cP at 20° C., and having a total of glycerin and (C) of 10 to 30 weight percent.

Furthermore, the ink-jet recording ink prepared by employing glycerin is superior in dissolving dyes during water evaporation, but results in a marked increase in viscosity, to not less than 1,000 cP. On the other hand, the ink-jet recording ink prepared by employing a water-soluble high-boiling point organic solvent having a viscosity of not more than 100 cP and of which surface tension is adjusted to not less than 40 dyne/cm by controlling the added amount of a surface active agent is inferior in dissolving dyes during water evaporation but results in only a small decrease in viscosity. The surface tension is preferably not more than 70 dyne/cm. Surface active agent is not preferably deed to the ink of the present invention.

The ink-jet recording ink inferior in dissolving dyes during water evaporation causes clogging at re-ejection after long-term suspension of printing due to the deposition of the dye. Furthermore, ink which exhibits an increase in viscosity during water evaporation exhibits an increase in viscosity during long-term suspension of printing. An ink-jet recording ink exhibiting increased viscosity is inferior in the rate of dissolution for the ink-jet recording ink having no water evaporation, and thus, it takes an excessive long time to obtain the desired stable ink ejection.

The above-mentioned problems are then resolved by adjusting the weight ratio of glycerin to the water-soluble high-boiling point organic solvent (C), having viscosity of not more than 100 cP at 20° C., to the range of ¼ to 4, and preferably to the range of ⅓ to 3.

Furthermore, the above-mentioned problems may be resolved by employing an ink-jet recording ink comprising preferably a water-soluble high-boiling point organic solvent (C) selected from ethylene glycol, 1,3-propanediol, thioglycol, monoacetin, diacetin, propylene glycol, and comprising more preferably a dye selected from water-soluble dyes of Acid Yellow 23, Direct Yellow 144, Reactive Red 180, Acid Red 249, Acid Blue 9, or water-soluble dyes represented by the general formula (1).

Viscosity was measured at 20° C. employing a vibration type Viscometer Model VM-1A-L (Yamaichi Denki Kogyo Co., Ltd.). Furthermore, density was measured at 20° C. employing a Density Meter Model DA-110 (Kyoto Electronics Co., Ltd.). Viscosity was then obtained by dividing the read value of the vibration type viscometer by the measured density.

Surface tension was measured employing a Surface Tension Balance CBVP Type A-3 (Kyowa Kagaku Co., Ltd.).

The water-soluble dyes which are effectively employed in the present invention are those which enable the prepared ink-jet recording ink to meet the above-mentioned requirements for the various characteristics. They are, for example, water-soluble direct dyes and/or acid dyes and/or reactive dyes and/or basic dyes. These dyes are chosen according how they meet the requirements and are dissolved in an employed solvent for the use. The representative dyes are listed below. Needless to say, these are examples and other dyes having similar structures can also be employed in the present invention.

Direct Dyes
    C.I. Direct Yellow: 1, 4, 8, 11, 12, 24, 26, 27, 28, 33, 39, 44, 50, 58, 85, 86, 100, 110, 142, 144
    C.I. Direct Red: 1, 2, 4, 9, 11, 13, 17, 20, 23, 24, 28, 31, 33, 37, 39, 44, 47, 48, 51, 62, 63, 75, 79, 80, 81, 83, 89, 90, 94, 95, 99, 220, 224, 227, 243
    C.I. Direct Blue: 1, 2, 6, 8, 15, 22, 25, 71, 76, 78, 80, 86, 87, 90, 98, 106, 108, 120, 123, 163, 165, 192, 193, 194, 195, 196, 199, 200, 201, 202, 203, 207, 236, 237
    C.I. Direct Black: 2, 3, 7, 17, 19, 22, 32, 38, 51, 56, 62, 71, 74, 75, 77, 105, 108, 112, 117, 154

Acid Dyes
    C.I. Acid Yellow: 2, 3, 17, 19, 23, 25, 29, 38, 42, 49, 59, 61, 72, 99
    C.I. Acid Orange: 56, 64
    C.I. Acid Red: 1, 8, 14, 18, 26, 32, 37, 42, 52, 57, 72, 74, 80, 87, 115, 119, 131, 133, 134, 143, 154, 186, 249, 254, 256
    C.I. Acid Violet: 11, 34, 75
    C.I. Acid Blue: 1, 7, 9, 29, 87, 126, 138, 171, 175, 183, 234, 236, 249
    C.I. Acid Green: 9, 12, 19, 27, 41
    C.I. Acid Black: 1, 2, 7, 24, 26, 48, 52, 58, 60, 94, 107, 109, 110, 119, 131, 155

Reactive Dyes
    C.I. Reactive Yellow: 1, 2, 3, 13, 14, 15, 17
    C.I. Reactive Red: 2, 6, 11, 23, 36
    C.I. Reactive Violet: 2, 4, 8, 9
    C.I. Reactive Blue: 7, 14, 15, 18, 21, 25

Basic Dyes
    C.I. Basic Yellow: 11, 14, 21, 32
    C.I. Basic Red: 1, 2, 9, 12, 13
    C.I. Basic Violet: 3, 7, 14
    C.I. Basic Blue: 3, 9, 24, 23

Besides dyes described above, those which can be employed for the ink-jet recording ink of the present invention may include chelate dyes and azo dyes employed for the silver dye bleach photosensitive materials (for example, Cibachrome manufactured by Ciba-Geigy).

Regarding the chelate dyes, the description in British Patent No. 1,077,484 may be a reference.

Regarding to azo dyes for the silver dye bleach photosensitive materials, the description in, for example, British Patent Nos. 1,039,456, 1,004,957 and 1,077,628, and U.S. Pat. No. 2,612,448 may be used as references.

The content of the water-soluble dye employed for the ink-jet recording ink of the present invention is in the range of 1 to 10 weight percent of the total weight of the ordinary ink-jet recording ink.

The ink-jet recording ink of the present invention is composed of, as the main liquid components, water and the water-soluble high-boiling point organic solvents of the present invention. However, besides these, water-soluble organic solvents may be utilized. The water-soluble organic solvents include alkyl alcohols (for example, methyl alcohol, ethyl alcohol, n-propyl alcohol, isopropyl alcohol, n-butyl alcohol, sec-butyl alcohol, tert-butyl alcohol, isobutyl alcohol, etc.), amides (for example, dimethylformamide, dimethylacetoamide, etc.), ketones or ketoalcohols (for example, acetone, diacetone alcohol, etc.), ethers (for example, tetrahydrofuran, dioxane, etc.), polyalkylene glycols (for example, polyethylene glycol, polypropylene glycol, etc.), alkylene glycols of which alkylene group has from 2 to 6 carbon atoms (for example, ethylene glycol, propylene glycol, butylene glycol, triethylene glycol, 1,2,6-hexanetriol, thiodiglycol, hexylene glycol, diethylene glycol, etc.), glycerin, lower alkyl ethers of polyhydric alcohol (ethylene glycol methyl ether, diethylene glycol methyl (or ethyl) ether, triethylene glycol monomethyl (or ethyl) ether, etc.) and the like.

Of these many water-soluble organic solvents, are preferred polyhydric alcohols such as diethylene glycol, etc., and lower alkyl ethers of polyhydric alcohols such as triethylene glycol monomethyl (or ethyl) ether, etc.

The content of the above-mentioned water-soluble organic solvent in the ink-jet recording ink is generally in the range of 10 to 70 weight percent of the total weight of the ink-jet recording ink.

Surface active agents may be employed in the ink-jet recording ink of the present invention for promoting the penetration of ink droplets into a medium after ejection. As the employable surface active agents, there is no limitation, as long as they exhibit no adverse effect on the stability, etc. of the ink.

Furthermore, electric conductivity controlling agents may be incorporated in the ink. Those are, for example, inorganic salts such as potassium chloride, ammonium chloride, sodium sulfate, sodium nitrate, sodium chloride, etc., and water-soluble amines such as triethanolamine.

In the ink-jet recording ink of the present invention, in accordance with the objects to improve ejection stability, compatibility with the print head or ink cartridge, storage stability, image retention quality and other various properties, viscosity controlling agents, film-forming agents, dispersion agents, UV absorbers, antioxidants, antidiscoloring agents, mildewcides, anticorrosive agents, etc. may be incorporated.

An ink-jet recording system of ink-jet recording methods employing the ink-jet recording ink of the present invention employs a continuous system. However, any other ink-jet recording systems may alternatively be employed. For example, there is shown an on-demand type system. As examples of on-demand type systems, there may specifically be shown an electrical-mechanical conversion system (for example, a single-cavity type, a double-cavity type, a blender type, a piston type, a share mode type, a shared wall type, etc.), an electrical-thermal conversion system (for example, thermal ink-jet type, bubble jet type, etc.) an electrostatic suction system (for example, an electric field control type, a slit jet type, etc.) and an electrical discharge system (for example, spark jet type, etc.).

The continuous system is a system in which pressure is applied to ink to continuously eject the ink. A nozzle is subjected to vibration at a constant interval by a piezoelectric element to assist in the formation of droplets. In the path of the ink droplet, a charge electrode and a deflection electrode are provided. The ink droplet is selectively charged during passing the charge electrode and the trajectory of the charged droplet is deflected by the deflection electrode.

The trajectories of the charged droplets and non-charged droplets are different. Thus the droplets are classified into the droplets which are directed onto the recording material and those which are recovered in a gutter.

EXAMPLES

The present invention is more specifically described with reference to Examples. However, the present invention is not limited to the embodiments in the Examples. The percent hereunder is by weight, unless otherwise specified.

Example 1

Ink-jet recording inks Nos. 1-1 to 1-17 having compositions described below were prepared.

| Compound | Added Amount |
| --- | --- |
| Dye (shown in Table 1) | shown in Table 1 |
| NaCl | 0.3% |
| Water-soluble high-boiling point organic solvent 1 | shown in Table 1 |
| Water-soluble high-boiling point organic solvent 2 | shown in Table 1 |
| Prokiseru GXL (manufactured by Zeneka Co.) | 0.01% |
| 2-Bromo-2-nitropropane-1,3-diol | 0.05% |
| Deionized water | rest |

The ink-jet recording inks having the above-mentioned compositions were prepared. The resulting inks were thoroughly dried at 50° C. and the deposition of the dye was visually inspected. Furthermore, the ink was continuously ejected for one hour employing an Ink-jet Printer EV-jetcolor (continuous system, manufactured by Konica Corp.) and the ejection stability was inspected depending on the disorder of image samples. Thereafter, the Printer itself was left at 24° C. and 20% humidity for one day, and one-hour continuous ejection was carried out. The re-ejection properties were evaluated based on the disorder in formed images.

The ejection properties were evaluated based on the small dot formation due to satellites and the disorder of impact positions. A lattice type straight line pattern was ejected and the resulting images were evaluated. The amount of fine particles, due to the satellites, having a diameter of ¼ to ⅒ as compared to that of the main particles, which were formed near main particles forming a straight line, was observed with a loupe of 50 magnifications. The disorder of the impact positions was evaluated based on the disorder of a straight line formed by main particles.

The evaluation of re-ejection properties was carried out by visually inspecting the disorder of the image. Namely, an image was ejected so that the reflection density under status T of the whole area was 1.0, and the variation in density of the image from first to the last printing was inspected, or the time from the first printing to the start of the variation in density was measured.

The deposition of the dye was evaluated on the following criteria:

AA: no deposition at all

A: little deposition

B: much deposition but wet

C: almost total deposition and dry.

The satellite was evaluated on the following criteria:

A: the number of small dots due to the satellites is less than 3 per main particle C: the number of small dots due to the satellite is 3 or more per main particle.

The accuracy in impact position was evaluated on the following criteria:

A: no deviation of each impact position is observed

B: no more than 2 deviations of impact position are observed per straight line of 30 cm C: 3 or more deviations of impact position are observed per straight line of 30 cm The re-ejection properties were evaluated on the following criteria:

AA: in 5 experiments, no variation in image density is observed.

B: in 1 of 5 experiments, noticeable variation in image density is observed

C: in 2 or more of 5 experiments, variation in image density is observed

D: in 2 or more of 5 experiments, variation in image density is observed, and among them, in 1 or more, variation in image density occurred within 8 minutes from the start of printing.

TABLE 1

| No. | | Dye | | High-boiling Point Organic Solvent (A) | | High-boiling Point Organic Solvent (B) | | Deposition | Satellites | Impact Error | Re-ejection Properties | (A) + (B) | (A)/(B) |
|---|---|---|---|---|---|---|---|---|---|---|---|---|---|
| 1-1 | Inv. | Direct Yellow 144 | 3% | Glycerin | 10% | Ethylene glycol | 10% | AA | A | A | AA | 20% | 1 |
| 1-2 | Inv. | Reactive Red 180 | 3% | Glycerin | 10% | Ethylene glycol | 10% | AA | A | A | AA | 20% | 1 |
| 1-3 | Inv. | Acid Red 249 | 3% | Glycerin | 10% | Ethylene glycol | 10% | AA | A | A | AA | 20% | 1 |
| 1-4 | Inv. | Acid Blue 9 | 3% | Glycerin | 10% | Ethylene glycol | 10% | AA | A | A | AA | 20% | 1 |
| 1-5 | Inv. | Compound 1 | 3% | Glycerin | 10% | Ethylene glycol | 10% | AA | A | A | AA | 20% | 1 |
| 1-6 | Inv. | Compound 3 | 3% | Glycerin | 10% | Ethylene glycol | 10% | AA | A | A | AA | 20% | 1 |
| 1-7 | Inv. | Compound 5 | 3% | Glycerin | 10% | Ethylene glycol | 10% | AA | A | A | AA | 20% | 1 |
| 1-8 | Inv. | Compound 6 | 3% | Glycerin | 10% | Ethylene glycol | 10% | AA | A | A | AA | 20% | 1 |
| 1-9 | Inv. | Compound 7 | 3% | Glycerin | 10% | Ethylene glycol | 10% | AA | A | A | AA | 20% | 1 |
| 1-10 | Inv. | Compound 8 | 3% | Glycerin | 10% | Ethylene glycol | 10% | AA | A | A | AA | 20% | 1 |
| 1-11 | Inv. | Compound 9 | 3% | Glycerin | 10% | Ethylene glycol | 10% | AA | A | A | AA | 20% | 1 |
| 1-12 | Inv. | Acid Yellow 23 | 3% | Glycerin | 10% | Ethylene glycol | 10% | AA | A | A | AA | 20% | 1 |
| 1-13 | Inv. | Acid Yellow 23 | 3% | Glycerin | 10% | Diethylene glycol | 10% | A | A | A | AA | 20% | 1 |
| 1-14 | Inv. | Direct Yellow 86 | 3% | 1,2,6-hexanetriol | 10% | Diethylene glycol | 10% | A | A | A | A | 20% | 1 |
| 1-15 | Inv. | Acid Yellow 23 | 1% | Glycerin | 10% | Diethylene glycol | 10% | A | A | B | A | 20% | 1 |
| 1-16 | Inv. | Acid Yellow 23 | 7% | Glycerin | 10% | Diethylene glycol | 10% | B | A | B | A | 20% | 1 |
| 1-17 | Inv. | Acid Yellow 23 | 3% | Glycerin | 15% | Diethylene glycol | 4% | A | A | B | B | 19% | 3.75 |
| 1-18 | Comp. | Acid Yellow 23 | 3% | Glycerin | 20% | Ethylene glycol | 4.5% | A | A | B | C | 25.5% | 4.44 |
| 1-19 | Comp. | Acid Yellow 23 | 3% | Glycerin | 4.5% | Ethylene glycol | 4.5% | C | C | C | A | 9% | 1 |
| 1-20 | Comp. | Acid Yellow 23 | 3% | Glycerin | 20% | Ethylene glycol | 3% | A | A | C | C | 23% | 6.66 |

(% in the table is by weight)
Inv.: Present Invention
Comp.: Comparative Example It is found that the ink-jet recording inks of the present invention are excellent in ejection stability and re-ejection stability after drying, as compared to those of the Comparative Examples.

Compounds 6 to 9 in the Table 1 are dyes as follows;

| Compounds 6 | Basacid Black X34 (BASF) |
| Compounds 7 | Special Black SP liquid (Bayer) |
| Compounds 8 | Bayscript Black SP liquid (Bayer) |
| Compounds 9 | Bayscript Black N liquid (Bayer) |

Example 2

Ink-jet recording inks Nos. 2-1 to 2-16 having compositions described below were prepared.

| Compound | Added Amount |
|---|---|
| Dye (shown in Table 2) | shown in Table 2 |
| NaCl | 0.3% |
| Water-soluble high-boiling point organic solvent 1 | shown in Table 2 |
| Water-soluble high-boiling point organic solvent 2 | shown in Table 2 |

-continued

| Compound | Added Amount |
|---|---|
| Surfinol 465 (manufactured by Nisshinn Chemical Corporation) | shown in Table 2 |
| Prokiseru GXL (manufactured by Zeneka Co.) | 0.01% |
| 2-Bromo-2-nitropropane-1,3-diol | 0.05% |
| Deionized water | rest |

The ink-jet recording inks having the above-mentioned compositions were prepared and the same evaluation as Example 1 was conducted. Dyes (6) to (9) in Table 2 are the same as in Example 1.

TABLE 2

| No. | | Dye | | High-boiling Point Organic Solvent 1 | | High-boiling Point Organic Solvent 2 | |
|---|---|---|---|---|---|---|---|
| 2-1 | Inv. | Direct Yellow 144 | 3% | Glycerin | 10% | Ethylene glycol | 10% |
| 2-2 | Inv. | Reactive Red 180 | 3% | Glycerin | 10% | Ethylene glycol | 10% |
| 2-3 | Inv. | Acid Red 249 | 3% | Glycerin | 10% | Ethylene glycol | 10% |
| 2-4 | Inv. | Acid Blue 9 | 3% | Glycerin | 10% | Ethylene glycol | 10% |
| 2-5 | Inv. | Compound 2 | 3% | Glycerin | 10% | Ethylene glycol | 10% |
| 2-6 | Inv. | Compound 4 | 3% | Glycerin | 10% | Ethylene glycol | 10% |
| 2-7 | Inv. | Compound 6 | 3% | Glycerin | 10% | Ethylene glycol | 10% |
| 2-8 | Inv. | Compound 7 | 3% | Glycerin | 10% | Ethylene glycol | 10% |
| 2-9 | Inv. | Compound 8 | 3% | Glycerin | 10% | Ethylene glycol | 10% |
| 2-10 | Inv. | Compound 9 | 3% | Glycerin | 10% | Ethylene glycol | 10% |
| 2-11 | Inv. | Acid Yellow 23 | 3% | Glycerin | 10% | Ethylene glycol | 10% |
| 2-12 | Inv. | Acid Blue 9 | 3% | Glycerin | 10% | Thiodiglycol | 10% |
| 2-13 | Inv. | Acid Blue 9 | 3% | Glycerin | 10% | Diethylene glycol | 10% |
| 2-14 | Inv. | Food Black 2 | 3% | Glycerin | 10% | Ethylene glycol | 10% |
| 2-15 | Inv. | Food Black 2 | 3% | Glycerin | 10% | Thiodiglycol | 10% |
| 2-16 | Inv. | Food Black 2 | 3% | Glycerin | 15% | Thiodiglycol | 4% |
| 2-17 | Comp. | Food Black 2 | 3% | Glycerin | 10% | Thiodiglycol | 10% |
| 2-18 | Comp. | Food Black 2 | 3% | Glycerin | 20% | Ethylene glycol | 4.5% |

(% in the table is by weight)
Inv.: Present Invention
Comp.: Comparative Example It is found that the ink-jet recording inks of the present invention are excellent in ejection stability and re-ejection stability after drying, as compared to those of the Comparative Examples.

Example 3

Image samples were prepared by employing the four color ink-jet recording inks 1-1, 1-4, 1-8 and 1-12 of Example 1. It was confirmed that images were excellent in color reproduction.

Color reproduction was evaluated as follows. Images having yellow, magenta, cyan, black, red (obtained by combining yellow and magenta), blue (obtained by combining magenta and cyan), and green (obtained by combining

TABLE 3

| No. | Safinol 465 | Deposition | Satellites | Impact Error | Re-ejection Property | Surface Tension dyne/cm | (A) + (B) | (A)/(B) |
|---|---|---|---|---|---|---|---|---|
| 2-1 | 0% | AA | A | A | AA | 45 | 20% | 1 |
| 2-2 | 0% | AA | A | A | AA | 44 | 20% | 1 |
| 2-3 | 0% | AA | A | A | AA | 47 | 20% | 1 |
| 2-4 | 0% | AA | A | A | AA | 46 | 20% | 1 |
| 2-5 | 0% | AA | A | A | AA | 41 | 20% | 1 |
| 2-6 | 0% | AA | A | A | AA | 42 | 20% | 1 |
| 2-7 | 0% | AA | A | A | AA | 41 | 20% | 1 |
| 2-8 | 0% | AA | A | A | AA | 43 | 20% | 1 |
| 2-9 | 0% | AA | A | A | AA | 42 | 20% | 1 |
| 2-10 | 0% | AA | A | A | AA | 44 | 20% | 1 |
| 2-11 | 0% | AA | A | A | AA | 45 | 20% | 1 |
| 2-12 | 0% | AA | A | A | A | 47 | 20% | 1 |
| 2-13 | 0% | AA | A | B | A | 47 | 20% | 1 |
| 2-14 | 0% | A | B | A | AA | 42 | 20% | 1 |
| 2-15 | 0% | A | A | B | B | 41 | 20% | 1 |
| 2-16 | 0% | A | B | A | B | 41 | 19% | 3.74 |
| 2-17 | 0.5% | C | C | B | A | 31 | 20% | 1 |
| 2-18 | 0% | A | C | C | C | 42 | 24.5% | 4.44 |

(% in the table is by weight)

yellow and cyan) were outputted and each reproduced color was visually evaluated.

I claim:

1. An ink-jet recording ink comprising a water-soluble high-boiling point organic solvent (A) having a viscosity of not less than 500 cP at 20° C., a water-soluble high-boiling point organic solvent (B) having a viscosity of not more than 30 cP at 20° C., a water-soluble dye, inorganic salt and water, wherein a total amount of (A) and (B) of 10 to 30 weight percent, and a weight ratio of (A) to (B) of ¼ to 4.

2. An ink-jet recording ink as claimed in claim 1, wherein a concentration of said water-soluble dye is 2 to 5 weight percent.

3. An ink-jet recording ink as claimed in claim 2, wherein the water-soluble dye is Acid Yellow 23, Direct Yellow 44, Reactive Red 180, Acid Red 249, Acid Blue 9, or a dye represented by the following formula (1),

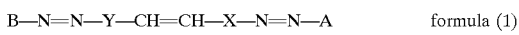
B—N=N—Y—CH=CH—X—N=N—A       formula (1)

wherein X and Y each independently represents a phenylene group having a —SO₃M group, and A and B each independently represents a phenyl group or a naphthyl group having a —SO₃M or a —COOH group, and M represents a hydrogen atom, an alkali metal atom, an ammonium salt or an amine derivative.

4. An ink-jet recording ink as claimed in claim 1, wherein said water-soluble high-boiling point organic solvent (B) is ethylene glycol.

5. An ink-jet recording ink comprising glycerin, a water-soluble high-boiling point organic solvent (C) having a viscosity of not more than 100 cP at 20° C., a water soluble dye and water, wherein a total weight of glycerin and said organic solvent (C) is 10 to 30 weight percent, a weight ratio of glycerin to said organic solvent (C) is ¼ to 4 and a surface tension of the ink is not less than 40 dyne/cm.

6. An ink-jet recording ink as claimed in claim 5, wherein the water-soluble high-boiling point organic solvents (C) is ethylene glycol, thiodiglycol, monoacetin, diacetin, 1,3-propanediol or propylene glycol.

7. An ink-jet recording ink as claimed in claim 5, wherein the water-soluble dye is Acid Yellow 23, Direct Yellow 144, Reactive Red 180, Acid Red 249, Acid Blue 9, or a compound represented by general formula (1),

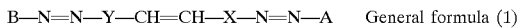
B—N=N—Y—CH=CH—X—N=N—A       General formula (1)

wherein X and Y each independently represents a phenyl group having a —SO₃M group, and A and B each independently represents a phenyl group or a naphthyl group having a —SO₃M or a —COOH group, and M represents a hydrogen atom, an alkali metal atom, an ammonium salt or an amine derivative.

8. An ink-jet recording method employing a continuous type ink-jet printer and an ink-jet recording ink as claimed in claim 1.

9. An ink-jet recording ink as claimed in claim 1, wherein the water-soluble high-boiling point organic solvent (A) is glycerin or 1,2,6-hexanetriol.

10. An ink-jet recording ink as claimed in claim 1, wherein the water-soluble high-boiling point organic solvent (A) is glycerin.

11. An ink-jet recording ink as claimed in claim 2, wherein said water-soluble high-boiling point organic solvent (B) is ethylene glycol.

12. An ink-jet recording ink as claimed in claim 3, wherein said water-soluble high-boiling point organic solvent (B) is ethylene glycol.

13. An ink-jet recording ink as claimed in claim 6, wherein the water-soluble dye is Acid Yellow 23, Direct Yellow 144, Reactive Red 180, Acid Red 249, Acid Blue 9, or a compound represented by general formula (1),

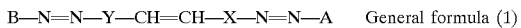
B—N=N—Y—CH=CH—X—N=N—A       General formula (1)

wherein X and Y each independently represents a phenyl group having a —SO₃M group, and A and B each independently represents a phenyl group or a naphthyl group having a —SO₃M or a —COOH group, and M represents a hydrogen atom, an alkali metal atom, an ammonium salt or an amine derivative.

14. An ink-jet recording method employing a continuous type ink-jet printer and an ink-jet recording ink as claimed in claim 5.

* * * * *